(12) United States Patent
Chu et al.

(10) Patent No.: US 9,396,145 B1
(45) Date of Patent: Jul. 19, 2016

(54) IN-CHIP BUS TRACER

(71) Applicant: Marvell International Ltd., Hamilton (BM)

(72) Inventors: Chee Hoe Chu, San Jose, CA (US); Ping Zheng, Milpitas, CA (US); Wei Zhou, San Jose, CA (US)

(73) Assignee: Marvell International Ltd., Hamilton (BM)

( * ) Notice: Subject to any disclaimer, the term of this patent is extended or adjusted under 35 U.S.C. 154(b) by 434 days.

(21) Appl. No.: 13/950,654

(22) Filed: Jul. 25, 2013

Related U.S. Application Data (60) Provisional application No. 61/675,644, filed on Jul. 25, 2012.

(51) Int. Cl.
*G06F 13/00* (2006.01)
*G06F 13/36* (2006.01)

(52) U.S. Cl.
CPC ...................................... *G06F 13/36* (2013.01)

(58) Field of Classification Search
CPC ...... G06F 13/4226; G06F 13/36; H04L 5/143
USPC .................................. 710/107, 100, 305–306
See application file for complete search history.

(56) References Cited

U.S. PATENT DOCUMENTS

| | | | | |
|---|---|---|---|---|
| 6,590,907 B1* | 7/2003 | Jones | ..................... | G06F 13/364 361/728 |
| 2006/0174052 A1* | 8/2006 | Kondo | ................ | G06F 13/4059 710/317 |
| 2007/0112984 A1* | 5/2007 | Ohara | ................ | G06F 13/4226 710/107 |
| 2014/0105244 A1* | 4/2014 | Moore | .................... | G06F 1/206 374/102 |

\* cited by examiner

*Primary Examiner* — Tim T Vo
*Assistant Examiner* — Kim T. Huynh (57) ABSTRACT

A single integrated circuit comprises one or more functional modules; a bus port; a bus in communication with the one or more functional modules and the bus port; and a bus tracer disposed within the integrated circuit and configured to capture activity on the bus. A method for a single integrated circuit comprising a bus comprises capturing, in a bus tracer disposed within the single integrated circuit, activity on the bus; and providing, through a bus port of the single integrated circuit, the activity captured by the bus tracer.

18 Claims, 5 Drawing Sheets

| Dev Addr/Num | Port | Dir | Type | Frame Len | Frame | Primitives | PHY Err | Temp |
|---|---|---|---|---|---|---|---|---|
| 8 | 3 | Tx | Frame | 5 (3 after SOF/SOAF and 2 before EOF) | 075A254E 008AD92C 00000000 00000000 E703FFFF | NIL | No Err | 78 |
| 8 | 3 | Rx | Primitve | 0 | NIL | ACK | No Err | 79 |
| 8 | 13 | Rx | Frame | 5 (3 after SOF/SOAF and 2 before EOF) | 015A254E 008AD92C 00000000 00000200 E35E875C | NIL | Disparity Coding | 89 |
| 8 | 13 | Tx | Primitive | 0 | NIL | NAK | Disparity Coding | 89 |

*FIG. 5*

IN-CHIP BUS TRACER

CROSS-REFERENCE TO RELATED APPLICATIONS

This disclosure claims the benefit of U.S. Provisional Patent Application Ser. No. 61/675,644, filed on Jul. 25, 2012, entitled "IN CHIP BUS TRACER (IC-BT)," the disclosure thereof incorporated by reference herein in its entirety.

FIELD

The present disclosure relates generally to the field of integrated circuits. More particularly, the present disclosure relates to recording bus activity within integrated circuits.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

Integrated circuits may include a bus for transporting data within the integrated circuit, and to and from the integrated circuit through bus ports. During development of such integrated circuits, it is often desirable to record activity on the bus, for example to support testing, debugging, performance tuning, and the like.

Figure 1:
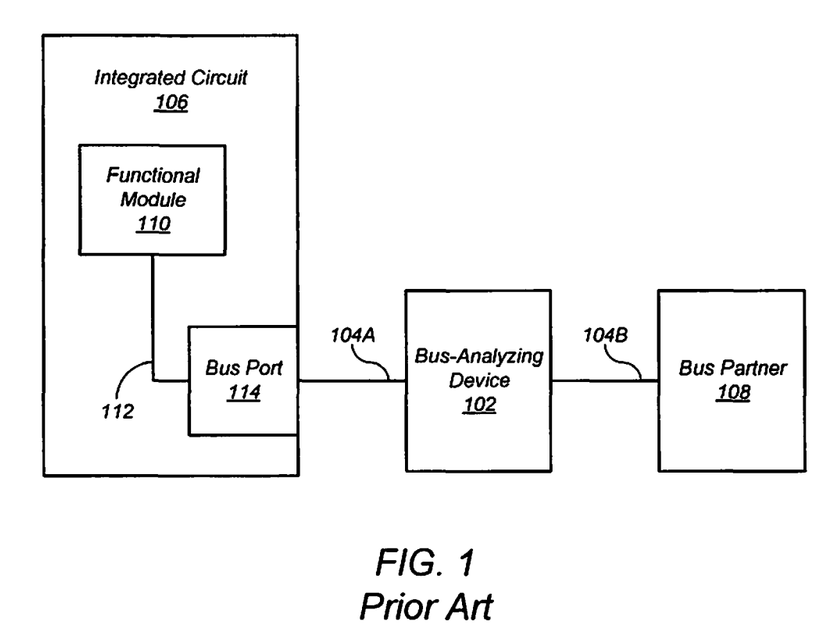
FIG. 1 show a bus testing approach. using an external bus-analyzing device.

One approach employs external test devices such as bus-tracing devices and bus-analyzing devices. FIG. 1 illustrates this approach. Referring to FIG. 1, an external bus-analyzing device 102 is connected by test cables 104A and 104B between an integrated circuit 106 and a bus partner 108. The integrated circuit 106 includes one or more functional modules 110 that are connected to a bus 112. The integrated circuit 106 generally includes at least one bus port 114. In such arrangements, the first test cable 104A is generally connected to one of the bus ports 114. In other arrangements, the first test cable 104A is connected by probes to probe nodes of the bus 112.

Another approach is to include error information registers in the integrated circuit 106. These registers collect error information during testing.

SUMMARY

In general, in one aspect, an embodiment features a single integrated circuit comprising: one or more functional modules; a bus port; a bus in communication with the one or more functional modules and the bus port; and a bus tracer disposed within the integrated circuit and configured to capture activity on the bus.

Embodiments of the apparatus can include one or more of the following features. In some embodiments, the bus tracer comprises: a memory; and bus tracer logic configured to control the capture of the activity on the bus, and to store the activity in the memory. In some embodiments, the bus tracer comprises: bus tracer logic configured to control the capture of the activity on the bus. In some embodiments, the bus tracer is further configured to provide the activity to the bus port. In some embodiments, the bus tracer logic is further configured to capture the activity on the bus in accordance with capture criteria stored in the memory. In some embodiments, the bus is an inband bus, the single integrated circuit further comprising: a sideband bus port; and a sideband bus, and wherein the sideband bus port is configured to provide the activity captured by the bus tracer. In some embodiments, the one or more functional modules comprise: a protocol module configured to execute a protocol state machine, wherein the protocol state machine is configured to generate protocol state information; and wherein the bus tracer is further configured to record the protocol state information. In some embodiments, the bus port comprises a port buffer; and the protocol state information comprises a number of buffer credits for the port buffer. In some embodiments, the bus port further comprises: a physical-layer device (PHY); and wherein the bus tracer is further configured to record an error status of the PHY. In some embodiments, the bus tracer is further configured to capture a die temperature of the single integrated circuit. In some embodiments, the bus tracer is further configured to generate one or more entries, wherein the one or more entries comprises, at least: the activity captured by the bus tracer; and a timestamp related to the activity captured by the bus tracer. In some embodiments, the activity captured by the bus tracer comprises at least one of: a device address; a device number; a bus port number; a traffic direction; a traffic type; a frame length; content of a frame; and a primitive type. In some embodiments, the bus tracer logic is further configured to start and/or stop recording the activity on the bus responsive to detecting a trigger event. In some embodiments, the trigger event comprises at least one of: a start of frame; an end of frame; a negative acknowledgement; a bus link event; and a bus error. In some embodiments, the single integrated circuit further comprises: a Serial Attached SCSI (SAS) expander. In some embodiments, a protocol of the bus includes one of: Peripheral Component Interconnect (PCI); Peripheral Component Interconnect Express (PCIe); Universal Serial Bus (USB); Serial ATA (SATA); Serial Attached SCSI (SAS); Fibre Channel; Ethernet; Power over Ethernet (PoE); Mobile to mobile convergence (MMC); Universal Flash Storage (UFS); cellular; Bluetooth; and Zigbee.

In general, in one aspect, an embodiment features a method for a single integrated circuit comprising a bus, wherein the method comprises: capturing, in a bus tracer disposed within the single integrated circuit, activity on the bus; and providing, through a bus port of the single integrated circuit, the activity captured by the bus tracer.

Embodiments of the method can include one or more of the following features. Some embodiments comprise storing, in a memory disposed within the single integrated circuit, the activity captured by the bus tracer. Some embodiments comprise controlling the capture of the activity on the bus in accordance with capture criteria stored in the memory. Some embodiments comprise capturing a die temperature of the single integrated circuit.

The details of one or more implementations are set forth in the accompanying drawings and the description below. Other features will be apparent from the description and drawings, and from the claims.

The leading digit(s) of each reference numeral used in this specification indicates the number of the drawing in which the reference numeral first appears.

DETAILED DESCRIPTION

Embodiments of the present disclosure provide in-chip bus tracers. In particular, one or more bus tracers are disposed within a single integrated circuit during manufacture of the integrated circuit. While the single integrated circuit is described herein as a Serial Attached SCSI (SAS) expander, the techniques described herein may apply to any single integrated circuit having a bus.

Figure 2:
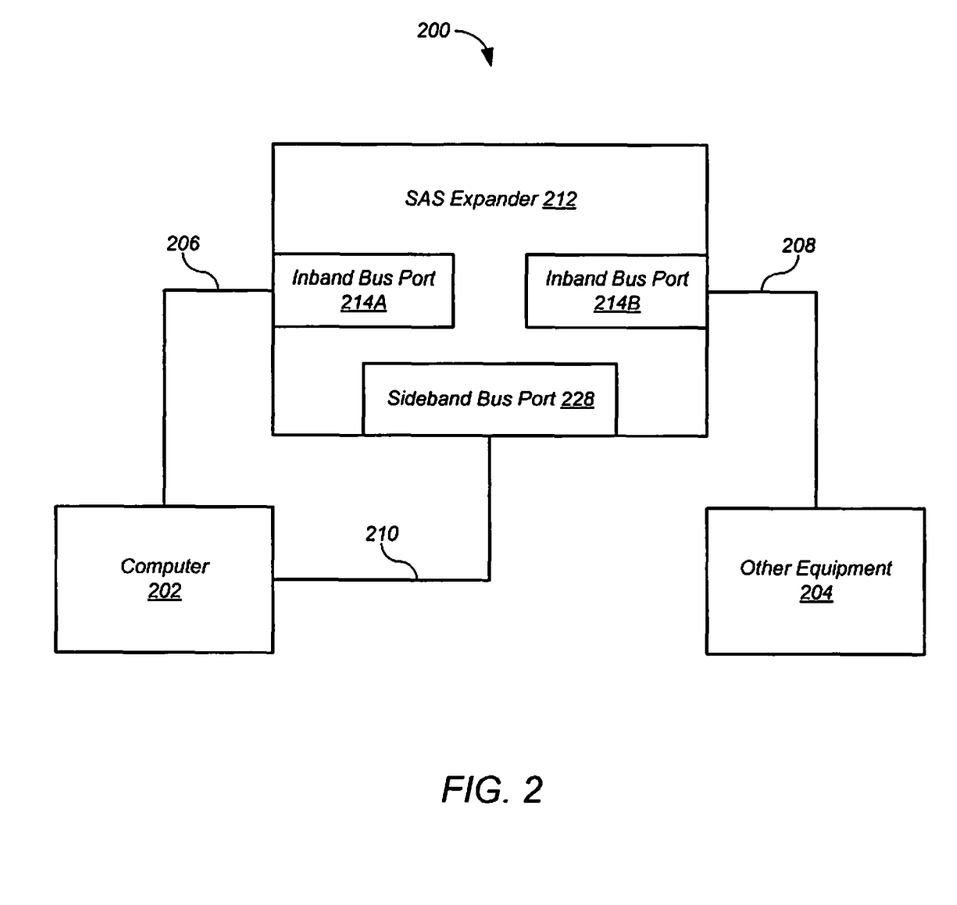
FIG. 2 shows a test setup for a Serial Attached SCSI (SAS) expander.

FIG. 2 shows a test setup 200 for a Serial Attached SCSI (SAS) expander 212. Although in the described embodiment, elements of the test setup 200 are presented in one arrangement, other embodiments may feature other arrangements. In the test setup 200, the SAS expander 212 is connected between a computer 202 and other equipment 204. That is, a first inband bus port 214A of the SAS expander 212 is connected to a bus port of the computer 202 by a first cable 206, and a second inband bus port 214B of the SAS expander 212 is connected to a bus port of the other equipment 204 by a second cable 208. In some embodiments, the sideband bus port 228 of the SAS expander 212 is connected to a sideband port of the computer 202 by a third cable 210. The computer 202 may be, for example, a general-purpose or special-purpose computer. The other equipment 204 may include additional SAS expanders 212, storage devices such as hard disk drives, and the like. When the other equipment 204 includes additional SAS expanders 212, the techniques described herein may be applied to those additional SAS expanders 212 as well.

Figure 3:
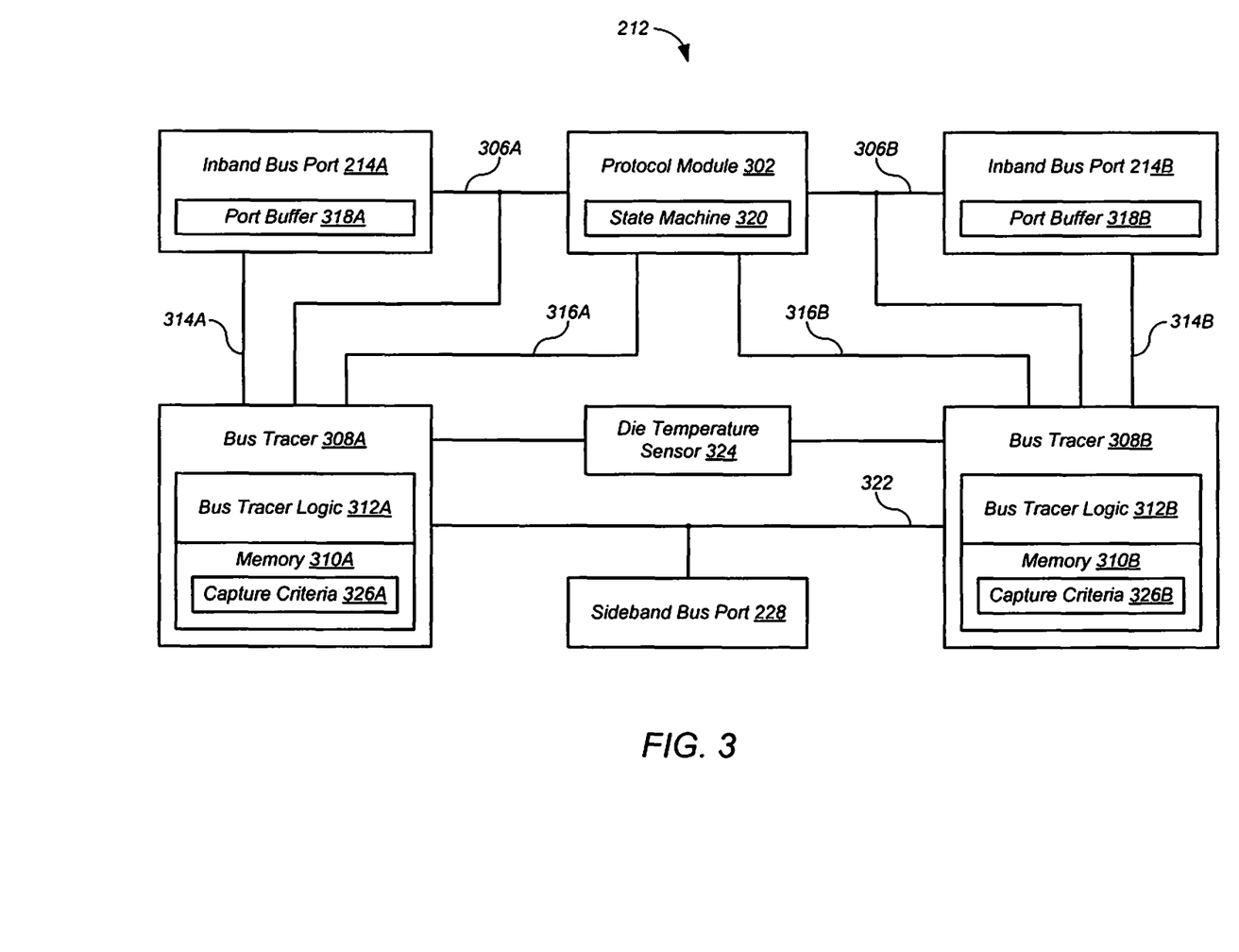
FIG. 3 shows elements of the SAS expander of FIG. 2 according to one embodiment.

FIG. 3 shows elements of the SAS expander 212 of FIG. 2 according to one embodiment. The SAS expander 212 is fabricated as a single integrated circuit. Although in the described embodiment elements of the SAS expander 212 are presented in one arrangement, other embodiments may feature other arrangements. And while the disclosed in-chip bus tracers are described in the context of a SAS expander 212, the in-chip bus tracers may be included in other integrated circuits having other bus protocols. For example, the bus protocols may include Peripheral Component Interconnect (PCI), Peripheral Component Interconnect Express (PCIe), Universal Serial Bus (USB), Serial ATA (SATA), Serial Attached SCSI (SAS), Fibre Channel, Ethernet, Power over Ethernet (PoE), Mobile to mobile convergence (MMC), Universal Flash Storage (UFS), cellular, Bluetooth, Zigbee, and the like.

Referring to FIG. 3, the SAS expander 212 includes one or more functional modules. In the embodiment of FIG. 3, the functional modules include a protocol module 302 that executes a state machine 320. The SAS expander 212 also includes a plurality of bus ports 214. Each bus port 214A,B includes a respective port buffer 318A,B. For clarity, only two bus ports 214A and 214B are shown in FIG. 3. However, SAS expanders 212 generally include larger numbers of bus ports 214. The techniques described herein may be applied to such additional bus ports 214 as well. The SAS expander 212 also includes one or more busses 306 in communication with the protocol module 302 and the bus ports 214. In particular, the SAS expander 212 includes a first bus 306A in communication with the protocol module 302 and the first bus port 214A, and a second bus 306B in communication with the protocol module 302 and the second bus port 214B.

The SAS expander 212 includes a respective bus tracer 308 for each bus 306. In particular, the SAS expander 212 includes a first bus tracer 308A connected to the first bus 306A and a second bus tracer 308B connected to the second bus 306B. Each bus tracer 308 includes a memory 310 and bus tracer logic 312. In particular, the first bus tracer 308A includes a first memory 310A and first bus tracer logic 312A, and the second bus tracer 308B includes a second memory 310B and second bus tracer logic 312B. The bus tracer logic 312 may be implemented as combinatorial logic or the like. The memories 310 may be implemented as static random-access memory (SRAM) or the like. The memories 310A,B may store respective capture criteria 326A,B.

Each bus tracer 308 is configured to capture bus activity on the connected bus 306. The bus activity captured by the bus tracers 308 may include device addresses, device numbers, bus port numbers, traffic direction, traffic type, frame length, content of frames, primitive types, and the like.

In some embodiments, the bus tracers 308 also collect information directly from the bus ports 214 over bus port connections 314. In particular, the first bus tracer 308A collects information from the first bus port 214A over a first bus port connection 314A, and the second bus tracer 308B collects information from the second bus port 214B over a second bus port connection 314B. The information collected from the bus ports 214 may include PHY error status, PHY error identifiers, and the like.

In some embodiments, the bus tracers 308 also collect information directly from the protocol module 302 over protocol module connections 316. In particular, the first bus tracer 308A collects information from the protocol module 302 over a first protocol module connection 316A, and the second bus tracer 308B collects information from the protocol module 302 over a second protocol module connection 316B. The information collected from the protocol module 302 may include protocol state information generated by the protocol state machine 320 and the like. The information collected from the protocol module 302 may also include buffer credits for the port buffers 318, such as transmit credits and receive credits, and the like.

In some embodiments, the bus activity captured by the bus tracers 308 is provided to external test equipment over one of the busses 306, which are also referred to herein as "inband" busses 306. In other embodiments, the bus activity captured by the bus tracers 308 is provided to external test equipment over a sideband bus 322 and the sideband bus port 228. The sideband bus 322 may be implemented as a universal asynchronous receiver/transmitter (UART) bus or the like.

In some embodiments, the SAS expander 212 includes a die temperature sensor 324. In some embodiments, the bus tracers 308 may capture the die temperature of the SAS expander 212 from the die temperature sensor 324.

Figure 4:
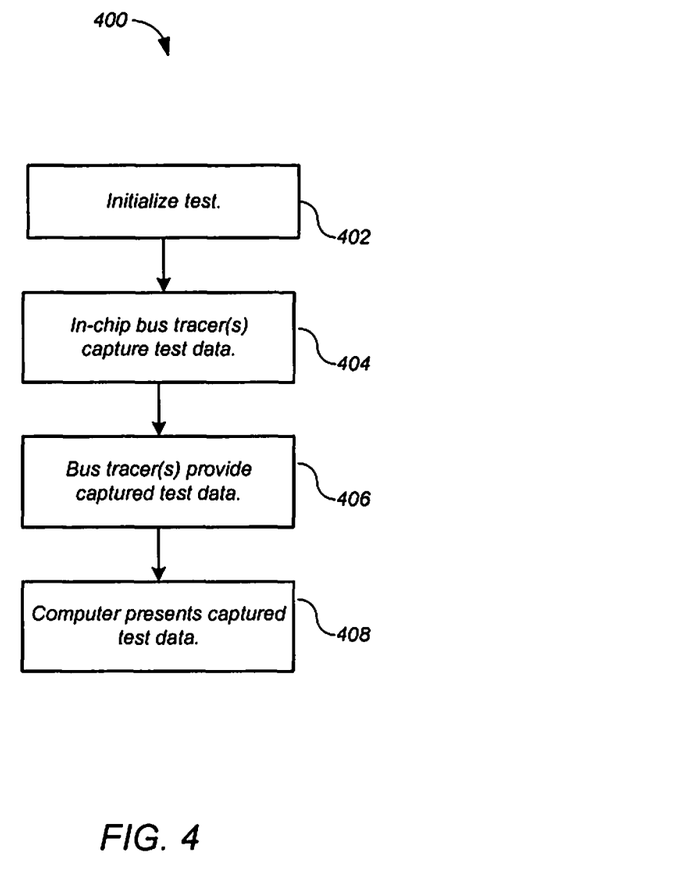
FIG. 4 shows a process for the test setup of FIG. 2 according to one embodiment.

FIG. 4 shows a process 400 for the test setup 200 of FIG. 2 according to one embodiment. Although in the described embodiments the elements of process 400 are presented in one arrangement, other embodiments may feature other arrangements. For example, in various embodiments, some or all of the elements of process 400 may be executed in a different order, concurrently, and the like. Also some elements of process 400 may not be performed, and may not be executed immediately after each other. In addition, some or all of the elements of process 400 may be performed automatically, that is, without human intervention.

Referring to FIG. 4, at 402, the test is initialized. For example, the computer 302 may store the capture criteria 326 in the memories 310 of the bus tracers 308 in the SAS expander 212. The computer 202 may load the capture criteria 326 in the memories 310 of the bus tracers 308 using the first inband bus 306A, the sideband bus 322, or both.

For example, the test may include transferring frames of data between the computer 202 and the other equipment 204 through the SAS expander 212. At 404, the bus tracers 308 capture test data. The test data may include activity on the inband busses 306, protocol state information generated by the protocol state machine 320 in the protocol module 302, die temperatures of the SAS expander 212, information collected from the bus ports 214, and the like.

The capture of the test data may be controlled by the bus tracer logic 312, for example in accordance with the capture criteria 326 stored in the bus tracer memories 310. The bus tracer logic 312 may also store the captured test data in the internal memories 310 or in external memories. The bus tracer logic 312 may provide metadata for the captured test data, for example such as record numbers, timestamps, and the like.

The capture criteria 326 may specify one or more trigger events. The bus tracer logic 312 may start and/or stop recording activity on the bus, and other conditions, responsive to detecting one of the trigger events. The trigger events may include a start of frame, an end of frame, a negative acknowledgement, a bus link event, a bus error, and the like. The capture criteria 326 may specify other recording parameters as well, such as how much data to capture responsive to a trigger event. For example, the capture criteria 326 may specify that, responsive to detecting a start of frame, the first 8 kB of the frame, and the last 8 bytes of the frame, should be captured.

At 406, the bus tracers 308 provide the captured test data. For example, the computer 202 may read the captured test data from the memories 310 of the bus tracers 308 using the first inband bus 306A, the sideband bus 222, or both. At 408, the computer 202 presents the captured test data. For example, a test application executing on the computer 202 provides a display of the test data.

Figure 5:
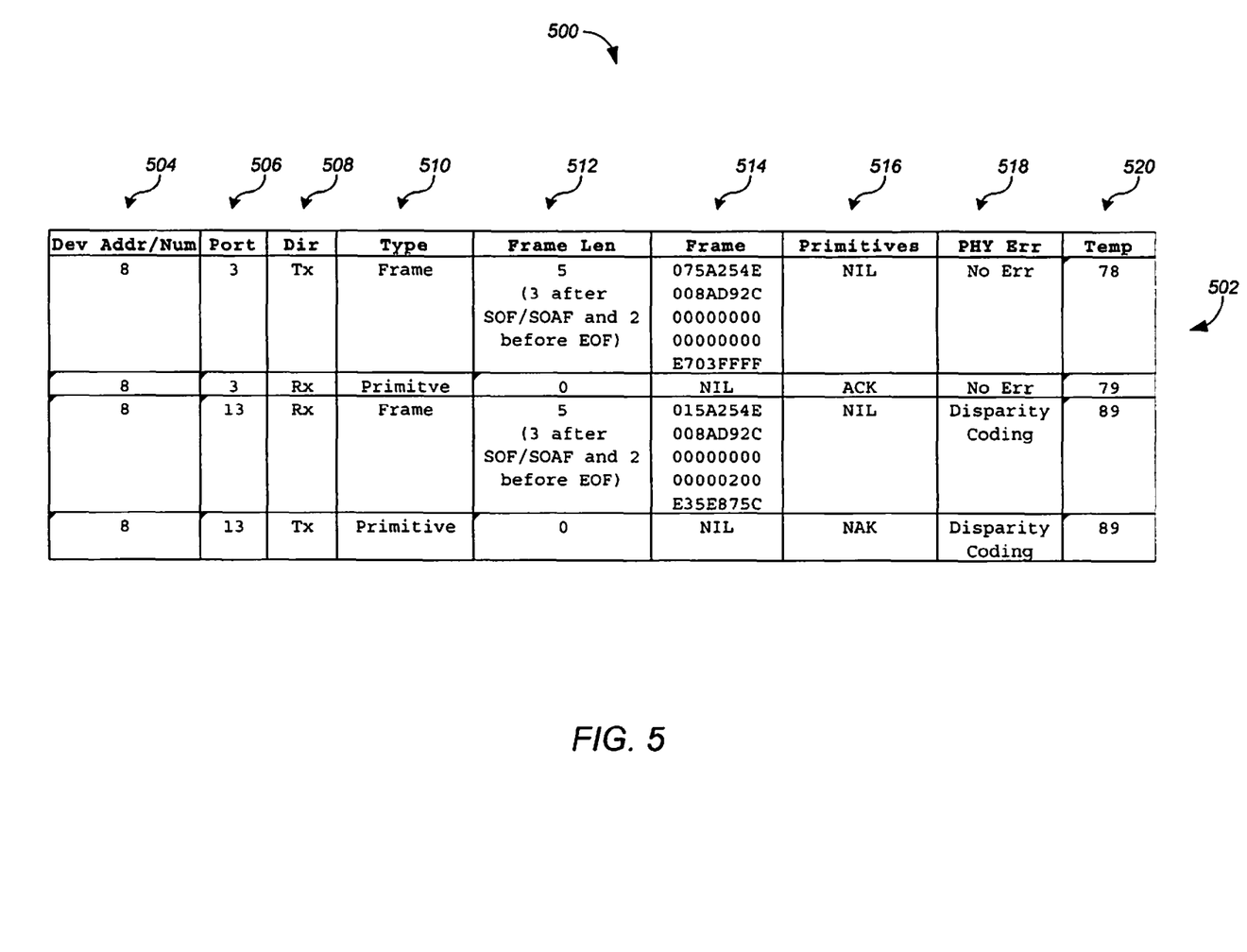
FIG. 5 shows an example display of test data according to one embodiment.

FIG. 5 shows an example display 500 of test data according to one embodiment. Referring to FIG. 5, the captured test data includes one or more entries 502. The length of the entries 502 may be configured before the test begins. In the example of FIG. 5, each entry 502 includes a device address and/or device number 504, a bus port number 506, a traffic direction 508, a traffic type 510, a frame length 512, content of the frame 514, primitive types 516, PHY error status 518, and a die temperature 520. In other embodiments, the entries may include other fields for other sorts of test data.

Various embodiments of the present disclosure may provide one or more of the following benefits. The disclosed bus tracers may be enabled during validation or qualification phases for good bus visibility, but disabled in the production phase to reduce power consumption. Even after production, the disclosed bus tracers may be enabled on demand to gather critical information of real-time issues. Also, the disclosed in-chip bus tracers are capable of collecting a wider variety of types of test data than external bus-tracing and bus-analyzing equipment.

Various embodiments of the present disclosure may be implemented in digital electronic circuitry, or in computer hardware, firmware, software, or in combinations thereof. Embodiments of the present disclosure may be implemented in a computer program product tangibly embodied in a computer-readable storage device for execution by a programmable processor. The described processes may be performed by a programmable processor executing a program of instructions to perform functions by operating on input data and generating output. Embodiments of the present disclosure may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, processors receive instructions and data from a read-only memory and/or a random access memory. Generally, a computer includes one or more mass storage devices for storing data files. Such devices include magnetic disks, such as internal hard disks and removable disks, magneto-optical disks; optical disks, and solid-state disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing may be supplemented by, or incorporated in, ASICs (application-specific integrated circuits). As used herein, the term "module" may refer to any of the above implementations.

A number of implementations have been described. Nevertheless, various modifications may be made without departing from the scope of the disclosure. Accordingly, other implementations are within the scope of the following claims.

What is claimed is:

1. A single integrated circuit comprising:
a first bus port configured to receive (i) capture criteria for a test from a host computer, and (ii) during the test, a plurality of frames from the host computer;
a second bus port coupled to equipment;
a first bus coupled to the first bus port;
a second bus coupled to the second bus port;
a protocol module (i) coupled to the first bus and the second bus, and (ii) configured to generate first protocol information, wherein, during the test, the plurality of frames are transferred to the equipment via the first bus, the protocol module, the second bus, and the second bus port; and
a first bus tracer configured to (i) during the test, monitor activity on the first bus or the second bus, (ii) capture first test data in accordance with the capture criteria, and (iii) report the first test data to the host computer, wherein the first test data includes (i) the first protocol information, and (ii) data pertaining to the monitored activity on the first bus or data pertaining to the monitored activity on the second bus.

2. The single integrated circuit of claim 1, wherein the bus tracer comprises:
a third bus port coupled to the host computer;
a third bus coupled to the bus tracer and the third bus port;
a memory configured to receive the capture criteria from the host computer via the first bus or the third bus; and
a bus tracer logic device configured to (i) control the capture of the data pertaining to the monitored activity on the first bus or the data pertaining to the monitored activity on the second bus, and (ii) store the first test data in the memory.

3. The single integrated circuit of claim 1, wherein:
the first bus port comprises a first buffer;
the second bus port comprises a second buffer; and the protocol information comprises a number of buffer credits for the first buffer or a number of buffer credits for the second buffer.

4. The single integrated circuit of claim 1, wherein:
the bus tracer is configured to collect first information from the first bus port or second information from the second bus port;
either
the first information comprises an error status of a physical layer device of the first bus port and an error identifier, or
the second information comprises an error status of a physical layer device of the second bus port and an error identifier; and
the bus tracer is configured to provide the first information or the second information to the host computer.

5. The single integrated circuit of claim 1, further comprising:
a sideband bus port coupled to the host computer; and
a sideband bus coupled to the bus tracer and the sideband bus port,
wherein the bus tracer is configured to provide, via the sideband bus and the sideband bus port, the data pertaining to the first bus or the data pertaining to the second bus to the host computer.

6. The single integrated circuit of claim 1, wherein:
the protocol module comprises a protocol state machine;
the protocol state machine is configured to generate the protocol information; and
the bus tracer is configured to record the protocol information.

7. The single integrated circuit of claim 1, further comprising a temperature sensor configured to detect a temperature of the single integrated circuit, wherein:
the bus tracer is configured to, during the test, capture an output of the temperature sensor; and
the test data comprises the temperature of the single integrated circuit.

8. The single integrated circuit of claim 1, further comprising:
a memory configured to receive the capture criteria from the host computer via the first bus; and
a bus tracer logic device configured to (i) control the capturing of the data pertaining to the monitored activity on the first bus or the data pertaining to the monitored activity on the second bus, and (ii) store the test data in the memory,
wherein and the bus tracer logic device is configured to generate metadata for the first test data, and wherein the metadata includes timestamps related to the first test data captured by the bus tracer.

9. The single integrated circuit of claim 1, wherein the first test data captured by the bus tracer comprises a device address, a device number, a bus port number, a traffic direction, a traffic type, a frame length, content of a frame, and a primitive type.

10. The single integrated circuit of claim 1, wherein:
the bus tracer comprises a logic device;
the logic device is configured to start and stop recording of the first test data in response to detecting a trigger event; and
the capture criteria indicate the trigger event.

11. The single integrated circuit of claim 10, wherein the trigger event is a frame start time, a frame end time a negative acknowledgement, a bus link event, or a bus error.

12. The single integrated circuit of claim 1, wherein a protocol of the first bus and the second bus is peripheral component interconnect protocol, a universal serial bus protocol, a serial advanced technology attachment protocol, a serial attached small computer system interface protocol, a fibre channel protocol, an Ethernet protocol, a power over Ethernet protocol, a cellular protocol, a universal flash drive storage protocol, or a wireless local area network protocol.

13. A method for a single integrated circuit, wherein the single integrated circuit comprises a first bus port, a second bus port, a first bus, a second bus, a protocol module, and a bus tracer, wherein the first bus port is coupled to a host computer, wherein the second bus port is coupled to equipment, the first bus is coupled to the first bus port and the protocol module, and wherein the second bus is coupled to the second bus port and the protocol module, the method comprises:
receiving capture criteria for a test from the host computer via the first bus port;
during the test,
receiving a plurality of frames from the host computer via the first bus port,
generating protocol information via the protocol module,
monitoring activity on the first bus or the second bus while the plurality of frames are transferred from the first bus port to the second bus port via the first bus, the protocol module, and the second bus, and
capturing at the bus tracer, test data in accordance with the capture criteria, wherein the test data includes the protocol information and either data pertaining to the monitored activity on the first bus or data pertaining to the monitored activity on the second bus; and
providing the test data captured at the bus tracer to the host computer.

14. The method of claim 13, further comprising storing, in a memory, the capture criteria and the test data captured by the bus tracer.

15. The method of claim 14, further comprising controlling the capturing of the test data in accordance with the capture criteria stored in the memory.

16. The method of claim 13, further comprising:
detecting a temperature of the single integrated circuit; and
capturing the temperature during the test,
wherein the test data comprises the temperature of the single integrated circuit.

17. The single integrated circuit of claim 1, further comprising a second bus tracer is configured to (i) during the test, monitor the activity on the second bus, (ii) capture second test data in accordance with the capture criteria, and (ii) report the second test data to the host computer, wherein:
the protocol module is configured to generate second protocol information corresponding to the second bus;
the second test data comprises second protocol information and the data pertaining to the monitored activity on the second bus;
the first bus tracer is configured to (i) during the test, monitor the activity on the first bus, and (ii) capture the first test data in accordance with the capture criteria, and (ii) report the first test data to the host computer; and
the first test data comprises first protocol information and the data pertaining to the monitored activity on the first bus.

18. The single integrated circuit of claim 17, wherein during the test:
the first bus tracer collects first information from the first bus port and forwards the first information to the host computer; and the second bus tracer collects second information from the second bus port and forwards the second information to the host computer.

* * * * *